United States Patent Office 3,554,002
Patented Jan. 12, 1971

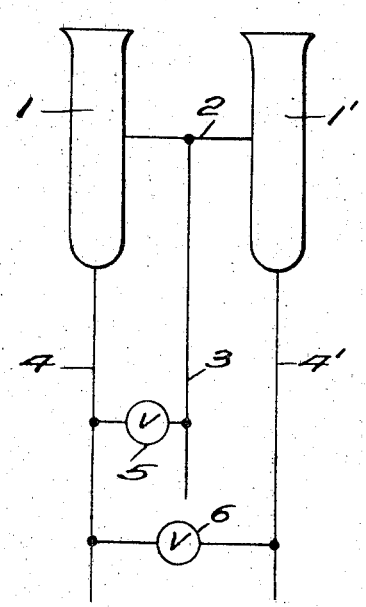
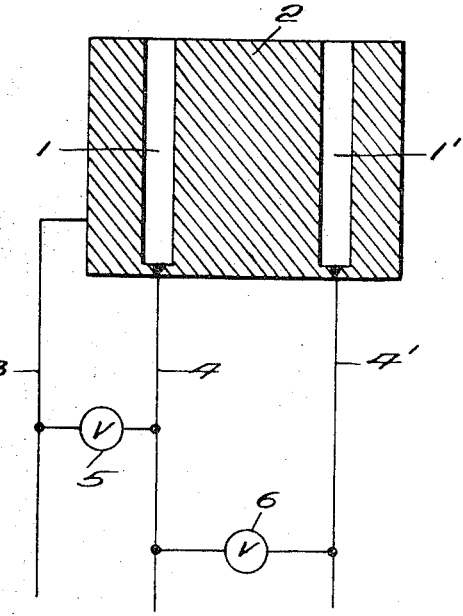
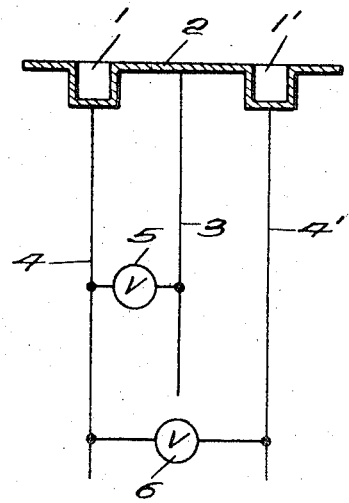

3,554,002
DIFFERENTIAL THERMAL ANALYSIS SAMPLE CELL
John Charles Harden, Wilmington, Del., and Donald Arthur Vassallo, Orange, Tex., assignors to E. I. du Pont de Nemours and Company, Wilmington, Del., a corporation of Delaware
Continuation-in-part of application Ser. No. 457,676, May 21, 1965, which is a continuation-in-part of application Ser. No. 136,887, Sept. 8, 1961. This application Feb. 17, 1967, Ser. No. 616,974
Int. Cl. G01n 25/00
U.S. Cl. 73—15　　　　　　　　　　　　　　　　13 Claims

ABSTRACT OF THE DISCLOSURE

A micro-cell useful for conducting differential thermal analysis constructed by joining two receptacles made of a thermocouple material by a connector made of the same thermocouple material, securing a lead, also made of the same thermocouple material, to the connector or the receptacles, attaching a lead made of a second thermocouple material to each of the aforementioned receptacles and measuring the voltages developed across the leads to determine the temperature differential as a function of temperature.

CROSS-REFERENCE TO RELATED APPLICATIONS

This application is a continuation-in-part of application Ser. No. 457,676, filed May 21, 1965, which in turn is a continuation-in-part of application Ser. No. 136,887, filed Sept. 8, 1961, now abandoned.

BACKGROUND OF THE INVENTION

Differential thermal analysis (DTA) is an analytical method which is employed to study the thermal behavior of a material or materials during thermal environmental changes. Basically, the method requires the measurement of the temperature differential between the material which is being analyzed and a standard which does not undergo a transition within the temperature range covered, as both are being heated or cooled simultaneously at a fixed rate. This temperature differential is constant until the sample being analyzed undergoes a thermal transition which either accelerates or retards its rate of temperature change. Differential thermal analysis is employed both in the analysis of organic as well as inorganic materials. Particularly for organic analysis, however, the precision, accuracy, sensitivity and resolution of the method as commonly employed is unsatisfactory, especially when the material being analyzed is either a mixture of components or a single multitransition compound wherein the thermal transitions occur at closely related temperatures.

An object of the present invention is to provide a differential thermal analysis micro-cell which is useful in the determination of thermal transitions in organic and inorganic materials, as well as in mixtures thereof. Another object is to provide such a cell which is useful in the determination of thermal transitions in polymeric materials. A still further object is to provide a differential thermal analysis micro-cell which is useful in the determination of phase transitions, heats of chemical reaction and heats of degradation. A further object is to provide such a cell which enables differential thermal analyses to be carried out with greater precision, accuracy, sensitivity and resolution than heretofore possible in the art. Other objects will become apparent hereinafter.

The objects of the invention are realized through use of a micro-cell which is fabricated from the same metals which form the thermocouple selected to study the thermal transitions occurring within the sample. The micro-cell, which thus serves as its own thermocouple, may be made quickly and easily as follows. A short length of tubing of one of the desired metals is sealed off on one end so as to provide a container. Two such receptacles are prepared, being electrically connected by means of a short length of wire of the same metal as the tubes, with a second wire of the same metal, joined to the first wire or to one of said receptacles. The position of the connecting wire is not critical since the receptacles and the connecting wire are at the same electrical potential with the necessary thermocouple formed by attaching to the closed end of each of the tubes a wire of a second thermocouple metal. The overall dimensions of the cell are determined by the precision, accuracy, sensitivity and resolution being sought, as weighed against the physical characterisitics desirable in the cell, for example, rigidity, strength, ease of handling, and the like. In general, the tube dimensions are held within the range 0.03–0.10 inch in diameter x 0.25–1.0 inch in length. Tubing wall thickness may vary from 0.001 to 0.006 inch, while wire size ranges from 0.003 to 0.013 inch in diameter. The tubes may be separated by from 0.5 inch to as little as the minimum distance at which physical contact can be avoided. Using the tubes as thus described, differential thermal analyses can be conducted using only 1 to 3 mg. of solid or 1 to 3 $\mu$l. of liquid. Because of the small sample quantities required the usual DTA reference material need not be used since the ambient atmosphere in the empty tube provides a satisfactory reference.

Measurements using the above-described micro-cell may be carried out in much the same fashion as when using the cells incorporated in the conventional differential thermal analysis instruments. Heat may be applied to the micro-cell by any convenient means, although an air circulating furnace is satisfactory for most uses. The tripple leads from the dual receptacles provide a means of measurement of both the sample-reference differential temperature and the absolute temperature. Each circuit may be attached directly to the input of a graphic X–Y recorder if sufficient amplification can be achieved within the recorder, or first to an amplifier and then to the recorder. A more detailed discussion of the electrical circuitry may be found in U.S. Pat. No. 3,117,438. In the present invention the twin receptacles are matched while in place with heat being applied to insure balanced electrical circuitry prior to introduction of the sample. If the initial baseline on the graphic recorder is not flat, the open end of one of the receptacles is trimmed off, a small portion at a time, until the baseline becomes level. By employing the micro-cell of the present invention with the conventional DTA temperature control and recording means known in the art, a precision and accuracy of ±0.3° C. is achieved over a range from about −240° C. to 1600°. Using a single 1–3 $\mu$l. sample of each of the compounds indicated below, the following melting and boiling points are obtained. The cell employed is fabricated from copper and constantan.

| Sample | M.P., ° C. (DTA) | M.P., ° C. (lit.) | B.P., ° C. (DTA) | B.P., ° C. (lit.) |
|---|---|---|---|---|
| n-Pentane | −129.5 | −129.7 | 36.2 | 36.0 |
| n-Heptane | −90.3 | −90.6 | 98.2 | 98.4 |
| n-Octane | −57.0 | −56.8 | 125.5 | 125.6 |
| Benzene | 5.2 | 5.5 | 80.5 | 80.1 |
| Acetic acid | 16.5 | 16.6 | 118.4 | 118.1 |

The above examples serve merely to illustrate and not limit the usefulness of the present invention.

The micro cell is graphically described in FIG. 1 which shows the twin sample tubes 1 and 1′, interconnected by means of a wire 2, of the same metal as the tubes and being one of two dissimilar metals capable of forming a thermocouple, with a second wire 3, also of the same metal as the tubes, serving as an electrical take-off from 2. The remaining wires 4 and 4' are fabricated from the other metal forming the thermocouple and provide the remaining electrical take-offs. Means for measuring the voltages, e.g., voltmeters, between 3 and 4 and between 4 and 4' are shown at 5 and 6, respectively.

In another embodiment of the invention, FIG. 2, a solid block of thermocouple metal 2 functions as the walls of the receptacles 1 and 1' and additionally as a common connector therebetween. A wire 3 of the same metal serves as an electrical take-off from the aforementioned block. Remaining wires 4 and 4' attached in proximity to the bottom of said receptacles form additional take-offs. The voltage measuring means again are designated 5 and 6.

A third embodiment as depicted in FIG. 3 incorporates a metal sheet 2, instead of the metal block described in the second emodiment, having receptacles 1 and 1' each formed by depressing a portion of the surface of said sheet. The items referenced by numbers 3, 4, 4', 5 and 6 are the same as the corresponding references in the previous embodiments. Because of the cleaning problem inherent in using recessed receptacles it may be advantageous to incorporate the flat surface of the metal sheet or an elevated portion thereof as a receptacle for the sample to be analyzed. Additionally, containers, either metal or nonmetal, of sufficient thickness to allow samples placed therein to maintain good thermal contact with leads 4 and 4', may be placed on or in said receptacles.

All connections indicated in the discussed invention may be made mechanically, using solder, e.g., silver solder, or other appropriate means. In the latter two embodiments preferable thermocouple metals are Chromel and constantan, however, other dissimilar metals perform the same function may be incorporated.

It will be understood that various changes in the details, materials, steps and arrangement of parts, which have been herein described and illustrated in order to explain the nature of the invention, may be made by those skilled in the art within the principles and scope of the invention as expressed in the appended claims.

What is claimed is:

1. A cell for use in differential thermal analysis, said cell comprising:
    (1) a sample receiving means fabricated of a first metal having two metal receptacles electrically coupled by a connecting means, each of said receptacles having a junction region in proximity to its base with a wall thickness of between 0.001 and 0.006 inch,
    (2) a first lead fabricated of said first metal affixed to said sample receiving means so as to serve as an electrical take-off therefrom,
    (3) a second lead fabricated of a second metal which is capable of forming a thermocouple with said first metal, affixed to the junction region in proximity to the base of one of said receptacles so as to serve as an electrical take-off therefrom, and
    (4) a third lead fabricated of said second metal affixed to the junction region in proximity to the base of the other of said metal receptacles so as to serve as an electrical take-off therefrom.

2. A cell according to claim 1 wherein said first lead is affixed to said connecting means of said sample receiving means.

3. A cell according to claim 1 wherein said connecting means is a lead electrically affixed to each of said receptacles.

4. A cell according to claim 3 wherein the two metal receptacles are separated in space by no more than 0.5 inch and each range in size from 0.03–0.10 inch x 0.25–1.0 inch having a wall thickness of from 0.001–0.006 inch, and wherein said leads connected to said receptacles are wires having a diameter of from 0.003–0.013 inch.

5. A cell according to claim 3 wherein said first metal is copper and said second metal is constantan.

6. A cell according to claim 1 wherein said connecting means is a solid metal block and said two metal receptacles are depressions within said metal block.

7. A cell according to claim 1 wherein said connecting means and said two metal receptacles are integrally formed.

8. A cell for use in differential thermal analysis, said cell comprising:
    (1) a sample receiving means fabricated of a first metal having two metal receptacles electrically coupled by a connecting means of said first metal, said connecting means being a metal sheet and each of said metal receptacles being a depression in said sheet,
    (2) a first lead fabricated of said first metal affixed to said sample receiving means so as to serve as an electrical take-off therefrom,
    (3) a second lead fabricated of a second metal which is capable of forming a thermocouple with said first metal, affixed in proximity to the base of one of said receptacles so as to serve as an electrical take-off therefrom, and
    (4) a third lead fabricated of said second metal affixed in proximity to the base of the other of said metal receptacels so as to serve as an electrical take-off therefrom.

9. A cell according to claim 8 wherein said first metal is constantan and said second metal is Chromel.

10. A cell for use in differential thermal analysis, said cell comprising:
    (1) a sample receiving means having two receptacles electrically coupled by a connecting means, said receptacles and said connecting means being a sheet of first metal, each of said receptacles including a container having good thermal contact with said sheet of first metal,
    (2) a first lead fabricated of said first metal affixed to said sample receiving means so as to serve as an electrical take-off therefrom,
    (3) a second lead fabricated of a second metal which is capable of forming a thermocouple with said first metal, affixed in proximity to the base of one of said receptacles so as to serve as an electrical take-off therefrom, and
    (4) a third lead fabricated of said second metal affixed in proximity to the base of the other of said metal receptacles so as to serve as an electrical take-off therefrom.

11. A cell according to claim 10 wherein said first metal is constantan and said second metal is Chromel.

12. A method of determining thermal transitions in a substance, which transitions affect the rate of temperature change, comprising placing a quantity of said substance in only one receptacle of two receptacles, both the said receptacles made of a first metal; connecting the said first receptacle to said second receptacle with a member made of said first metal; connecting a member made of a second metal to each of said receptacles at a point in proximity to the base of each of said receptacles where the wall thickness of said receptacles is between 0.001–0.006 inch; applying heat simultaneously and substantially equally to both receptacles; and measuring the voltage produced across said two members made of said second metal, said voltage indicating any thermal transitions in said substance.

13. A method as in claim 12 wherein the receptacles are 0.03 to 0.1 inch in diameter and 0.25 to 1 inch in length and said second receptacle is empty.

(References on following page)

References Cited

FOREIGN PATENTS 1,233,678  10/1960  France _____ 73—15

OTHER REFERENCES

Morita, H. and Rice, H. M.: Characterization of Organic Substances by Differential Thermal Analysis, Analytical Chemistry, vol. 27, No. 3, pp. 336, 339, March 1955.

Mazieres, Charles: Apparatus for Differential Thermal Microanalysis, Académie des Sciencos, 248, 1959, 2990–2992.

JAMES J. GILL, Primary Examiner

J. K. LUNSFORD, Assistant Examiner